United States Patent
Morgan, Jr.

(10) Patent No.: US 8,528,698 B2
(45) Date of Patent: Sep. 10, 2013

(54) VOLUME ADJUSTING CONTAINERS

(75) Inventor: Christopher C. Morgan, Jr., Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 581 days.

(21) Appl. No.: 12/774,142

(22) Filed: May 5, 2010

(65) Prior Publication Data
US 2011/0271791 A1    Nov. 10, 2011

(51) Int. Cl.
*F16N 31/00* (2006.01)
*F16N 33/00* (2006.01)
*F16C 3/14* (2006.01)

(52) U.S. Cl.
USPC .......................... 184/106; 184/1.5

(58) Field of Classification Search
USPC .................................. 184/1.5, 106
See application file for complete search history.

(56) References Cited

U.S. PATENT DOCUMENTS

| | | | |
|---|---|---|---|
| 3,354,924 A * | 11/1967 | Birrell et al. | 220/666 |
| 3,583,525 A | 6/1971 | Holcomb | |
| 3,675,511 A * | 7/1972 | Wakamatsu et al. | 477/138 |
| 4,157,103 A * | 6/1979 | La Fleur | 141/98 |
| 4,296,716 A | 10/1981 | Hofbauer et al. | |
| 4,457,274 A | 7/1984 | Gottlob | |
| 5,058,545 A * | 10/1991 | Hirai et al. | 123/195 C |
| 5,379,862 A * | 1/1995 | Schmidt et al. | 184/106 |
| 5,465,692 A | 11/1995 | Uraki et al. | |
| 5,488,935 A | 2/1996 | Berry, Jr. | |
| 5,727,651 A | 3/1998 | Benedict | |
| 6,234,136 B1 * | 5/2001 | Choi et al. | 123/195 C |
| 6,705,270 B1 | 3/2004 | Rau et al. | |
| 7,069,899 B1 * | 7/2006 | Okuda et al. | 123/195 C |
| 7,077,285 B2 | 7/2006 | Beer | |
| 2001/0037788 A1 * | 11/2001 | Okuda et al. | 123/195 C |
| 2003/0029412 A1 * | 2/2003 | Kato et al. | 123/195 C |
| 2005/0245351 A1 * | 11/2005 | Yamada et al. | 477/110 |
| 2007/0135801 A1 * | 6/2007 | Hood et al. | 604/892.1 |
| 2007/0181090 A1 | 8/2007 | Jeanne | |
| 2008/0083586 A1 * | 4/2008 | Kobayashi et al. | 184/6.4 |

* cited by examiner

*Primary Examiner* — William A Rivera
*Assistant Examiner* — Henry Liu
(74) *Attorney, Agent, or Firm* — Dinsmore & Shohl LLP

(57) ABSTRACT

A container for receiving an automotive fluid includes a receptacle body defining a container volume for holding the automotive fluid. The receptacle body includes connecting structure for connecting the receptacle body to a vehicle. The receptacle body is at least partially formed by a shape changing material arranged and configured to change the container volume.

16 Claims, 2 Drawing Sheets

VOLUME ADJUSTING CONTAINERS

TECHNICAL FIELD

The present specification generally relates to containers and, more particularly to containers having an adjustable volume.

BACKGROUND

It may be desirable to maintain fluid for a transmission in a motor vehicle at, or near, a predetermined level. Improper levels of fluid can reduce performance of the transmission in a number of ways. If the fluid level is low, it may be difficult to distribute fluids and components come into contact and excessive mechanical wear may result. If the fluid level is high, moving machinery through the fluid such as lubricant requires additional energy compared to moving the machinery through air.

Transmissions may be expensive to replace and can require that a vehicle, such as a bus or a truck, be taken out of service for what may amount to an extended period of time. Such a service procedure can reduce the profitability of an organization, further compounding the problem. Accordingly, there is a need for system that may provide a more consistent fluid level in transmission assemblies or other mechanical systems.

SUMMARY

In one embodiment, a container for receiving an automotive fluid includes a receptacle body defining a container volume for holding the automotive fluid. The receptacle body includes connecting structure for connecting the receptacle body to a vehicle. The receptacle body is at least partially formed by a shape changing material arranged and configured to change the container volume.

In another embodiment, a transmission assembly for a vehicle includes a transmission case and a lubricant pan having a container volume for holding a transmission fluid. The lubricant pan includes connecting structure connecting the lubricant pan to the transmission case. At least one of a side wall and bottom of the lubricant pan is at least partially formed by a shape changing material arranged and configured to change the container volume in response to a temperature change of the transmission fluid.

In another embodiment, a vehicle includes a case and a lubricant pan having a container volume for holding an automotive fluid. The lubricant pan includes connecting structure connecting the lubricant pan to the case. The lubricant pan includes a shape changing material arranged and configured to change the container volume in response to a temperature change of the automotive fluid.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to containers used in vehicles for catching lubricants, such as oil, transmission fluids and other fluids. Such containers for catching lubricants may be referred to as lubricant pans. As will be described herein, the lubricant pans may be formed of a shape changing material that can be used to change a volume of the lubricant pan. The volume may be changed, for example, based on temperature of a fluid retained by the lubricant pan, which can be used to maintain or minimize a change in fluid level of the fluid in the lubricant pan.

Machines that have moving elements may use a variety of fluids. These fluids can serve to lubricate, transfer heat, or any number of other uses. The level of these fluids may be important for proper operation of a machine. If the level is too low, friction and inadequate heat transfer may damage the machine. If the level is high, moving machinery through the fluid such as lubricant requires additional energy compared to moving the machinery through air.

Machines may incorporate elements, such as a lubricant pan, that retain fluid within components of the machine when the machine is operating. As one example, the vehicle's engine may have a lubricant ban connected to a crankcase. Transmission assemblies, as another example, may include a lubricant pan that collects transmission fluid. Fluid may circulate through the transmission assembly and the lubricant pan while the transmission is operating at a rate that is dependent upon factors such as the transmission gear setting and speed. When the transmission assembly is not operating, fluid is drawn into the pan by the force of gravity. However, not all of the fluid may drain into the lubricant pan. The transmission components may have recesses and grooves that retain fluid.

When the transmission assembly is operating, the transmission fluid may be dispersed throughout the working parts of the transmission assembly with less than all of the fluid being in the lubricant pan. Thus, the fluid level may not account for disbursed fluid while the transmission assembly is operating. Additionally, the volume of the transmission fluid may depend upon the operating temperature of the transmission assembly. When the fluid temperature is high, the transmission fluid may expand and there may be a larger volume of transmission fluid.

Figure 1:
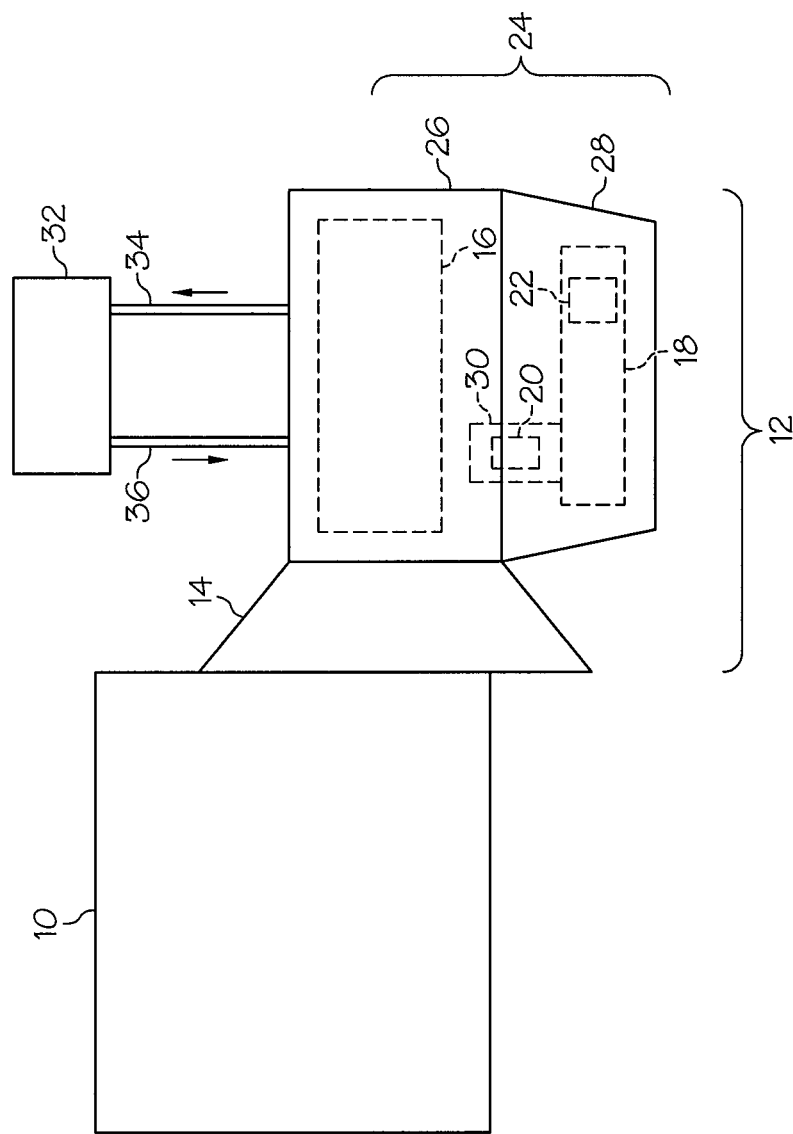
FIG. 1 is a diagrammatic illustration of a transmission assembly connected to an engine according to one or more embodiments shown and described herein.

Referring to FIG. 1, an exemplary embodiment of an engine 10 and an automatic transmission assembly 12 are illustrated diagrammatically mounted in a vehicle. While an automatic transmission assembly 12 is shown, the transmission may be manual. The automatic transmission assembly 12 may include a torque converter 14 which may be connected to an output shaft of the engine 10; a gear train 16 which may be connected to an output shaft of the torque converter 14; a hydraulic pressure supply unit 18 which may be used to switch a shift state (gear ratio) of the gear train 16 based on a supply of hydraulic pressure from hydraulic fluid; and a control unit 20 which may control the supply of hydraulic pressure from the hydraulic pressure supply unit 18 based on the running state of the vehicle and the operating state of the engine. The hydraulic pressure supply unit 18 may include a plurality of solenoid valves 22 such as regulator valves. The control unit 20 may control the supply of hydraulic pressure from the hydraulic pressure supply unit 18 to the torque converter 14 and the gear train 16 by switching these solenoid valves 22 open and closed. The torque converter 14, the gear train 16, the hydraulic pressure supply unit 18, and the control unit 20 may all be housed inside a case 24 formed of a gear case 26 and a lubricant pan 28. The control unit 20 may include a plurality of electronic components which are housed in a case 30 to protect them from becoming fouled by hydraulic fluid. In other embodiments, the control unit 20 may be located outside the case 24. While an automatic transmission is shown, the transmission may be manual.

An oil cooler 32 for cooling the hydraulic fluid may be provided outside the case 24. Two passages may be provided to connect the oil cooler 32 with the hydraulic pressure supply system inside the automatic transmission assembly 12. One of these passages may be an introduction passage 34 for introducing hydraulic fluid of a raised temperature into the oil cooler 32, and the other of the passages may be a return passage 36 for returning hydraulic fluid that has been cooled by the oil cooler 32 back into the automatic transmission assembly 12.

Figure 2:
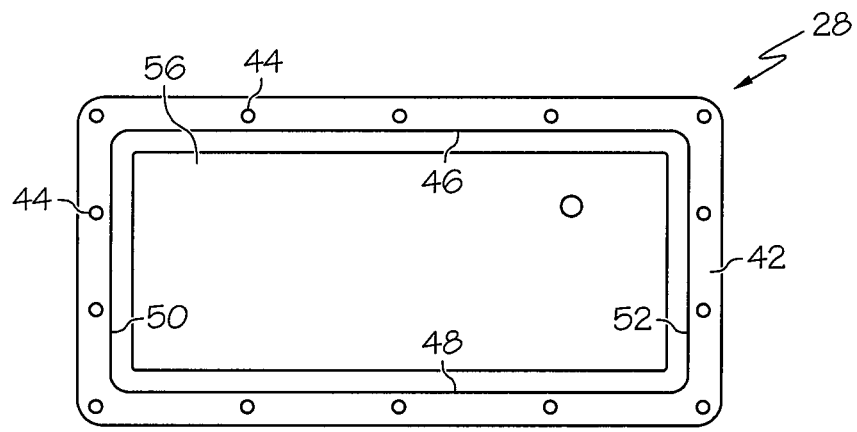
FIG. 2 is a top view of a lubricant pan for use in the transmission assembly of FIG. 1 according to one or more embodiments shown and described herein.

Referring to FIG. 2, one exemplary embodiment of the lubricant pan 28 is illustrated as an open ended container having an upper flange 42 extending around its periphery and formed with a series of holes 44 or other connecting structure for bolts or other fasteners, which secure the lubricant pan 28 to a transmission case. Side walls 46, 48 extend along the length of the pan, end walls 50, 52 extend along the width of the pan and a bottom surface 56 extends between the side walls 46, 48 and end walls 50, 52 forming a receptacle body. In some embodiments, the connecting structure for connecting the lubricant pan 28 with the transmission case may allow for some movement of the lubricant pan 28 once the lubricant pan 28 is connected to the transmission case. While the lubricant pan 28 is illustrated as having a single compartment, the lubricant pan 28 may have two or more compartments, for example, separated by one or more dividers.

Figure 3:
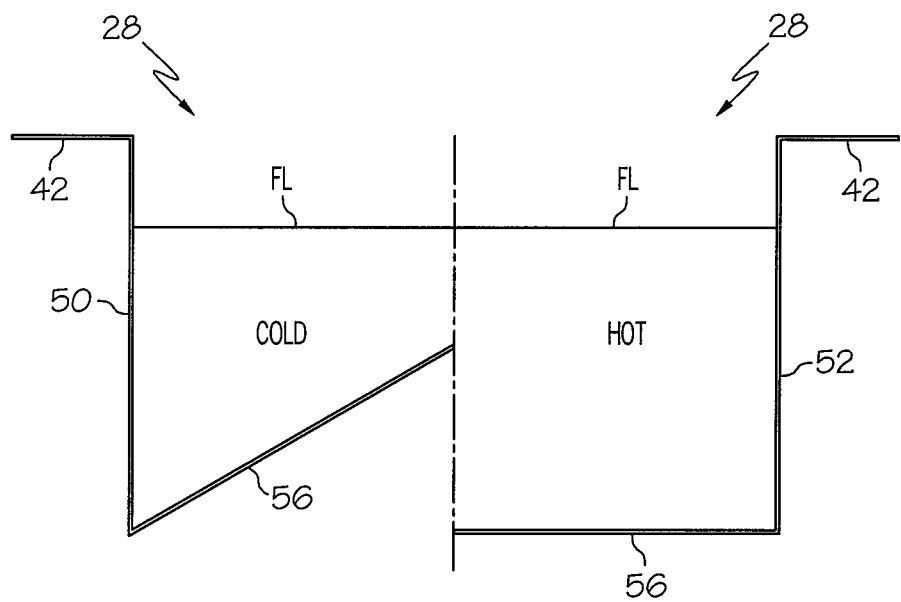
FIG. 3 illustrates the lubricant pan of FIG. 2 in a lower volume configuration and a higher volume configuration according to one or more embodiments shown and described herein.

Referring now to FIG. 3, the lubricant pan 28 may be formed of a shape changing material, such as one or more bimetallic strips that can be used to vary the volume of the lubricant pan 28. As will be described herein, the volume of the lubricant pan 28 can change with changes in temperature of the fluid in the lubricant pan 28. As used herein, the term "shape changing material" refers to any material or combination of materials (e.g., bimetallic structures) that change shape in response to a stimulus. The change in shape of the shape changing material may be in a predictable or an unpredictable manner. Bimetallic materials, for example, may generally be formed of two or more strips of metal having different thermal coefficients of expansion that are laminated or otherwise joined together such that they change configuration in a manner dependent on the temperature. This change in configuration is due to changes in temperature that cause one strip to lengthen more than the other. Since both strips are joined together, this length difference can be accommodated by bending. An equation for the deflection of a free end of a cantilevered bimetallic strip is:

$$D = \frac{FL^2T}{2t}$$

where D is the deflection at the end of the strip in inches, F is flexivity, L is length in inches, t is thickness in inches and T is temperature change in degrees F. In many bimetals, flexivity is equal to 1.5 times the difference in thermal coefficient of linear expansion of the high and low expanding components.

Figure 4:
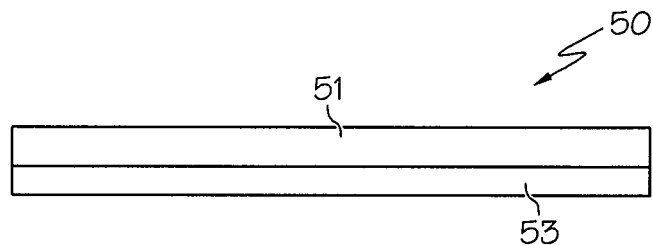
FIG. 4 illustrates a thermally moveable body for use in forming the lubricant pan of FIG. 2 according to one or more embodiments shown and described herein.

Referring briefly to FIG. 4, bending of thermally movable body 50 may follow the bimetallic strip deflection equation above, so thinner layers and materials with a large difference in expansion coefficient may show the greatest heat induced movement. Metals and/or plastics may be used in forming the strips, where plastics may have larger coefficients (e.g., by a factor of 10) than some metals, providing a higher level of thermal sensitivity, if desired. In many embodiments, the thermally moveable body 50 includes a first strip 51 having a first thermal expansion coefficient and a second strip 53 having a second, different thermal expansion coefficient. The strips 51 and 53 may be joined by any suitable method, such as riveting, brazing and/or welding.

The bending direction of the moveable body 50 can be controlled in a number of ways. In general, the moveable body 50 may bend away from the strip with the greater expansion coefficient. Some plastics, such as polyethylene, exhibit biaxial expansion coefficients that differ in two directions. Biaxial expansion can result from stretching the plastic during manufacture, from inclusion of aligned, low-expansion fillers such as glass fibers, or from grooves or raised lines in the film in general, the moveable body 50 will bend along the direction of higher expansion coefficient.

The amount of curling may be linear with temperature. The displacement D may double with a doubling in the temperature difference, for example. A non-linear displacement can be achieved by pre-shaping the moveable body 50 into an arc perpendicular to the direction of thermal curl. When heated, the moveable body 50 tries to expand and bend, but first must overcome the forces created by the initial arc. Once the temperature rise creates enough force, the moveable body 50 may snap open into a curl or straighten out if in an initial bent shape. Nonlinear curling can be obtained by attaching a weight or small magnet to one end of the moveable body 50. The moveable body 50 may not move until enough force is generated to overcome the weight or magnet.

Referring back to FIG. 3, any one or more of the side walls 46, 48, end walls 50, 52 and bottom 56 may be formed of the shape changing materials and/or a combination of shape changing materials. In some embodiments, the shape changing materials may be formed and selected to provide a percent change in volume that approximates or is about the same as the percent increase in volume of the lubricant due to temperature increase in the lubricant. Petroleum based lubricants commonly used in automobile applications, for example, may expand up to 10 percent or more in volume for every 100° C. increase in temperature. In one embodiment, if the lubricant expands 10 percent (or more) in volume for every 100° C., the shape changing material may be selected such that the volume of the lubricant pan 28 increases 10 percent or more for every 100° C. the shape changing material increases in temperature. As can be seen, FIG. 3 illustrates the lubricant pan 28 in an initial, lesser volume configuration (labeled COLD) and in a heated, greater volume configuration (labeled HOT). In this example, the bottom 56 of the lubricant pan 28 may lower with respect to end walls 50 and 52 (and side walls 46 and 48) to provide the lubricant pan 28 with a greater volume (e.g., depending on the increase in lubricant temperature). As represented by FIG. 3, the fluid level FL stays about the same even though the lubricant volume changes due to the changing volume of the lubricant pan 28.

While bimetallic materials are discussed above, other shape changing materials may be used. For example, shape changing materials may include shape memory polymers (SMPs). SMPs are polymeric materials which have the ability to return from a deformed state (temporary shape) to their original (permanent) shape induced by an external stimulus, such as a temperature change. A change in shape caused by a change in temperature may be referred to as a thermally induced shape-memory effect. The SMP may be programmed to recover a shape. The programming process may include any of heating a sample, deforming the sample and cooling the sample to provide a permanent shape. The permanent shape may be stored while the sample is in a temporary shape. Applying a suitable external stimulus may induce the shape memory effect where the permanent shape is restored. In some embodiments, heating the SMP above a transition temperature may induce the shape-memory effect. Cooling the SMP below the transition temperature may solidify the material. In some embodiments, there may be no recovery of the temporary shape, which may be referred to as one-way shape memory effect. Further programming, e.g., including mechanical deformation may be used to bring the SMP into a temporary shape again, which may not necessarily match the first temporary shape.

The permanent shape of an SMP can be set by melting or processing the SMP at a temperature higher than the highest thermal transition temperature for the SMP or its melting point, followed by cooling below that thermal transition temperature. A temporary shape can be set by heating the SMP to a temperature higher than the thermal transition temperature, but lower than the highest thermal transition temperature or the melting point. The temporary shape is set by applying an external stress while processing the SMP above the thermal transition temperature followed by cooling to fix the temporary shape. With the SMP in the temporary shape, it may be applied to the structural component of the vehicle structural member. The SMP may then be reverted to the permanent shape by heating the SMP above the thermal transition temperature but below the highest thermal transition temperature or it melting point. In some embodiments, triple shape memory materials may be used, which can store two shapes in memory.

SMPs may be configured in numerous forms and shapes. The temperature needed for permanent shape recovery may be set at any suitable temperature for lubricant operating temperatures. Engineering the composition and the structure of the SMP may allow for the choice of the selected temperature for the particular application.

SMPs include, but are not limited to, thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Exemplary polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like, and combinations comprising at least one of the foregoing polymer components. Examples of polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

In some embodiments, selection of the thermal transition temperature may depend on a number of factors. In some embodiments, it may be desirable for the transition temperature to correspond to a preselected lubricant temperature corresponding to a predetermined volume increase.

Aside from strict shape recovery, any material that can be made to linearly expand or contract may be used for the shape changing material. Any material selected for the shape changing material for the lubricant pan 28 should be suitable for use under normal operating conditions of the vehicle.

The above-described lubricant pan having volume adjusting capabilities can be used to control (or maintain) a fluid level of lubricant contained by the lubricant pan. In some embodiments, the fluid level may be maintained within about 50 percent or less, such as within about 40 percent or less, such as within about 30 percent or less, such as within about 20 percent or less, such as within about 10 percent or less while the lubricant is heated (e.g., every 100° C.) and expanding. Maintaining the fluid level in the lubricant pan can improve vehicle performance by dispersing the lubricant throughout the working parts of the transmission while reducing energy required to move components through the lubricant.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A container for receiving an automotive fluid, comprising:
    a receptacle body defining a container volume for holding the automotive fluid, the receptacle body including connecting structure for connecting the receptacle body to a vehicle;
    wherein the receptacle body is at least partially formed by a shape changing material arranged and configured to change the container volume;
    wherein the shape changing material is selected to provide a percent increase in the container volume that is about the same as a percent increase in volume of the automotive fluid due to a temperature increase of the automotive fluid;
    wherein the receptacle body is at least partially formed by a bimetallic structure.

2. The container of claim 1, wherein the bimetallic structure changes shape from a first configuration to a second configuration in response to a temperature change of the automotive fluid received within the container volume.

3. The container of claim 1, wherein the receptacle body includes a front wall, a back wall, side walls extending from the front wall to the back wall and a bottom wall, the bottom wall including the shape changing material.

4. The container of claim 1, wherein the shape changing material is selected to increase the container volume by changing shape as temperature of the automotive fluid retained in the container volume increases.

5. The container of claim 1, wherein the container volume increases about 10 percent for a temperature increase of about 100° C.

6. A transmission assembly for a vehicle, comprising:
   a transmission case;
   a lubricant pan having a container volume for holding a transmission fluid, the lubricant pan comprising:
      connecting structure connecting the lubricant pan to the transmission case;
      wherein at least one of a side wall and bottom of the lubricant pan is at least partially formed by a shape changing material arranged and configured to change the container volume in response to a temperature change of the transmission fluid; and
   a transmission fluid in the container volume of the lubricant pan;
   wherein the shape changing material is selected to provide a percent increase in the container volume that is about the same as a percent increase in volume of the transmission fluid due to a temperature increase of the transmission fluid;
   wherein the at least one of a side wall and bottom of the lubricant pan is at least partially formed by a bimetallic structure.

7. The transmission assembly of claim 6, wherein the bimetallic structure changes shape from a first configuration to a second configuration in response to a temperature change of the transmission fluid received within the container volume.

8. The transmission assembly of claim 7, wherein, the bottom includes the bimetallic structure.

9. The transmission assembly of claim 6, wherein the container volume increases about 10 percent for a temperature increase of about 100° C.

10. The transmission assembly of claim 6 further comprising:
    a gear train located in the transmission case; and
    a hydraulic pressure supply unit, wherein the gear train switches a shift state based on supply of hydraulic pressure from the hydraulic pressure supply unit.

11. A vehicle, comprising:
    a case;
    a lubricant pan having a container volume for holding an automotive fluid, the lubricant pan comprising:
       connecting structure connecting the lubricant pan to the case;
       wherein the lubricant pan includes a shape changing material arranged and configured to change the container volume in response to a temperature change of the automotive fluid; and
    an automotive fluid in the container volume of the lubricant pan;
    wherein the shape changing material is selected to provide a percent increase in the container volume that is about the same as a percent increase in volume of the automotive fluid due to a temperature increase of the automotive fluid;
    wherein the at least one of a side wall and bottom of the lubricant pan is at least partially formed by a bimetallic structure.

12. The vehicle of claim 11, wherein the case is a transmission case and the automotive fluid is a transmission fluid.

13. The vehicle of claim 11, wherein the bimetallic structure changes shape from a first configuration to a second configuration in response to a temperature change of the automotive fluid received within the container volume.

14. The vehicle of claim 13, wherein, the bottom includes the bimetallic structure.

15. The vehicle of claim 11, wherein the container volume increases about 10 percent for a temperature increase of about 100° C.

16. The vehicle of claim 11, wherein the case is a crankcase of an engine and the automotive fluid is oil.

* * * * *